United States Patent [19]

Brockhaus et al.

[11] Patent Number: 4,587,893
[45] Date of Patent: May 13, 1986

[54] GRAIN DRYING BIN

[75] Inventors: Donald B. Brockhaus; Calvin L. Fuehrer, both of Fremont; Walter E. Swartz, Wahoo, all of Nebr.; Vernon H. Sietmann, Laurel, Iowa

[73] Assignee: Stormor, Inc., Fremont, Nebr.

[21] Appl. No.: 771,595

[22] Filed: Sep. 3, 1985

[51] Int. Cl.⁴ .................................... E04H 7/22
[52] U.S. Cl. ............................ 98/55; 52/303; 52/588
[58] Field of Search .............. 98/55; 52/245, 246, 52/247, 302, 303, 588

[56] References Cited

U.S. PATENT DOCUMENTS

| | | | |
|---|---|---|---|
| 1,977,391 | 10/1934 | Kramer | 98/55 |
| 1,981,434 | 11/1934 | Shodron | 98/55 |
| 2,818,009 | 12/1957 | Steffen | 98/55 |
| 3,283,459 | 11/1966 | Beranek et al. | 55/302 |
| 3,501,845 | 3/1970 | Seitmann | 34/33 |
| 3,555,762 | 1/1971 | Costanzo, Jr. | 52/588 |
| 3,591,994 | 7/1971 | Steffen | 52/303 |
| 3,943,636 | 3/1976 | Seitmann et al. | 34/56 |
| 4,035,928 | 7/1977 | Seitmann et al. | 98/55 |
| 4,037,527 | 7/1977 | Steffan | 98/55 |

Primary Examiner—Ronald C. Capossela
Attorney, Agent, or Firm—Zarley, McKee, Thomte, Voorhees & Sease

[57] ABSTRACT

A tension band for a grain drying bin is described which extends around the lower end of a conical-shaped drying floor positioned within the bin. The lower end of the grain drying floor is secured to the tension band which is secured to the wall of the bin so that the weight of the grain drying floor is transferred to the concrete foundation supporting the bin through horizontally spaced and vertically disposed stiffeners.

5 Claims, 4 Drawing Figures

GRAIN DRYING BIN

BACKGROUND

This invention relates to a grain drying bin and more particularly to a grain drying bin having a tension band which extends around the lower end of a grain drying floor positioned within the bin.

In grain drying bins such as disclosed in U.S. Pat. Nos. 3,501,845; 3,943,636 and 4,035,928, a perforated grain drying floor is provided within the bin above the lower end thereof. The grain to be dried is deposited on the perforated drying floor with the drying air being passed upwardly through the grain to dry the same. When the grain has been dried, the grain is normally dumped through troughs or dump chutes located at the lower end of the drying floor.

In grain drying bins such as described in the above-identified patents, it is necessary to provide sufficient support for the grain drying floor since a large amount of weight is imposed thereon by the grain positioned thereon. In U.S. Pat. No. 4,035,928, a stiffening or strengthening tube was secured to the underside of the grain drying floor by a plurality of U-shaped clips or brackets. The stiffening tube in the U.S. Pat. No. '928 patent was length-adjustable to enable the grain drying floor to be placed in compression to stiffen the same.

Although the stiffening tube described in the U.S. Pat. No. '928 patent did sufficiently strengthen the grain drying floor, the stiffening tube described therein was not able to uniformly transfer the weight of the grain drying floor to the walls of the bin. Further, the tube described in the U.S. Pat. No. '928 patent was rather difficult to fabricate.

It is, therefore, a principal object of the invention to provide an improved means for stiffening or strengthening a grain drying floor positioned within a grain drying bin.

A further object of the invention is to provide a tension band for a grain drying bin which is economical to manufacture.

Yet another object of the invention is to provide a tension band for a grain drying bin which is easy to fabricate.

Yet another object of the invention is to provide a tension band for a grain drying bin which transfers the weight of the grain drying floor to the concrete foundation supporting the bin through vertical supports.

These and other objects will be apparent to those skilled in the art.

SUMMARY OF THE INVENTION

A tensioning band for a grain drying bin is disclosed which extends around the lower end of a conical shaped grain drying floor positioned within the grain drying bin. The tension band is secured to the wall of the bin so that the weight of the grain drying floor is transmitted to the concrete foundation supporting the bin through horizontally spaced and vertically disposed stiffeners.

DESCRIPTION OF THE PREFERRED EMBODIMENT

The numeral 10 generally designates a grain bin of the drying type such as disclosed in U.S. Pat. No. 3,501,845. The bin 10 is capable of drying granular material on the perforated drying floor 12 in the manner described in U.S. Pat. No. 3,501,845. Inasmuch as this invention relates only to the tension band for supporting the floor 12, other details of the bin have been omitted.

Figure 1:
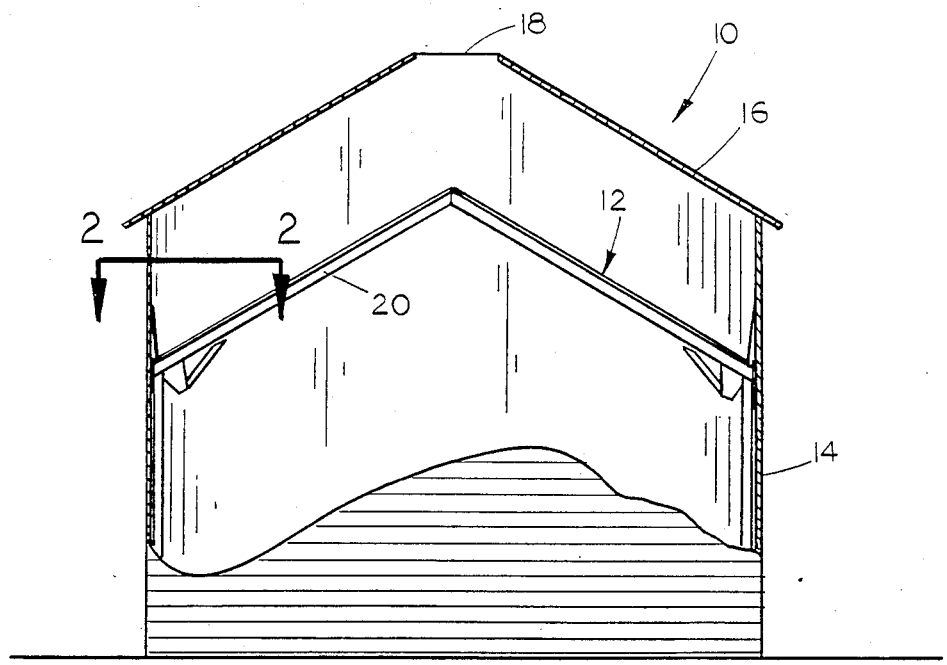
FIG. 1 is a partial sectional view of a grain bin having the band of this invention incorporated therein.

The grain bin 10 comprises a side wall 14 and a conical shaped roof 16 mounted thereon. An opening 18 is formed in the apex of the roof 16 as seen in FIG. 1 and which may be closed by a suitable cover (not shown). Bin 10 preferably includes a base floor (not shown) and conventional grain drying equipment such as in U.S. Pat. No. 3,501,845.

Drying floor 12 comprises a plurality of radially extending and spaced-apart purlins or rafters 20 and 21 which extend downwardly and outwardly from the upper center of the bin. Preferably, two intermediate rafters 21 are positioned between pairs of rafters 20. The intermediate rafters 21 preferably have a Z cross section while the rafters 20 preferably have a double C cross section. The upper ends of the rafters 20 and 21 are joined together by any suitable means. Positioned over the rafters 20 and 21 are a plurality of perforated panels 22 which are joined together at their adjacent side edges. Panels 22 are secured to roof pipes 23 which are secured to the rafters 20 and 21.

Figures 2, 3:
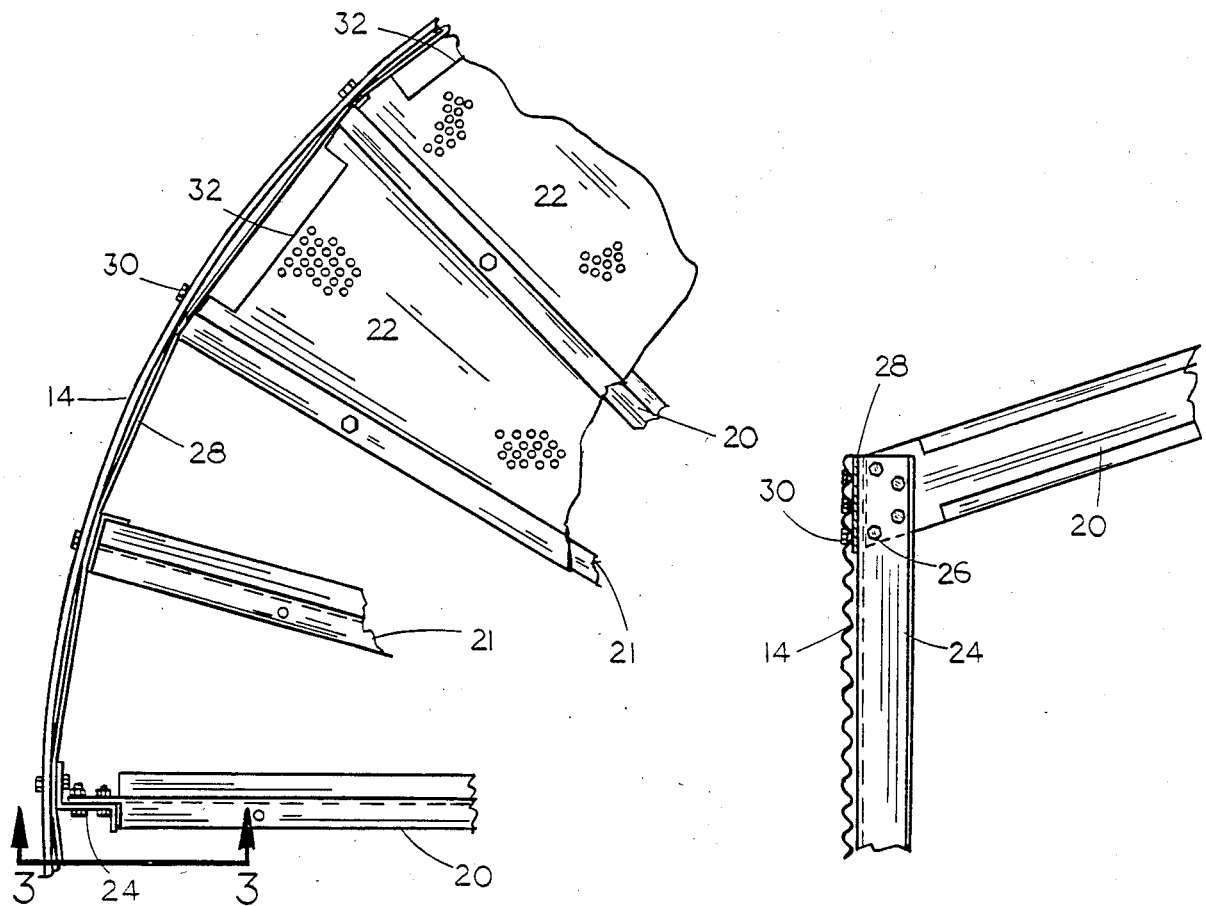
FIG. 2 is an enlarged sectional view taken on lines 2—2 of FIG. 1.
FIG. 3 is a sectional view taken on lines 3—3 of FIG. 2.
Figure 4:
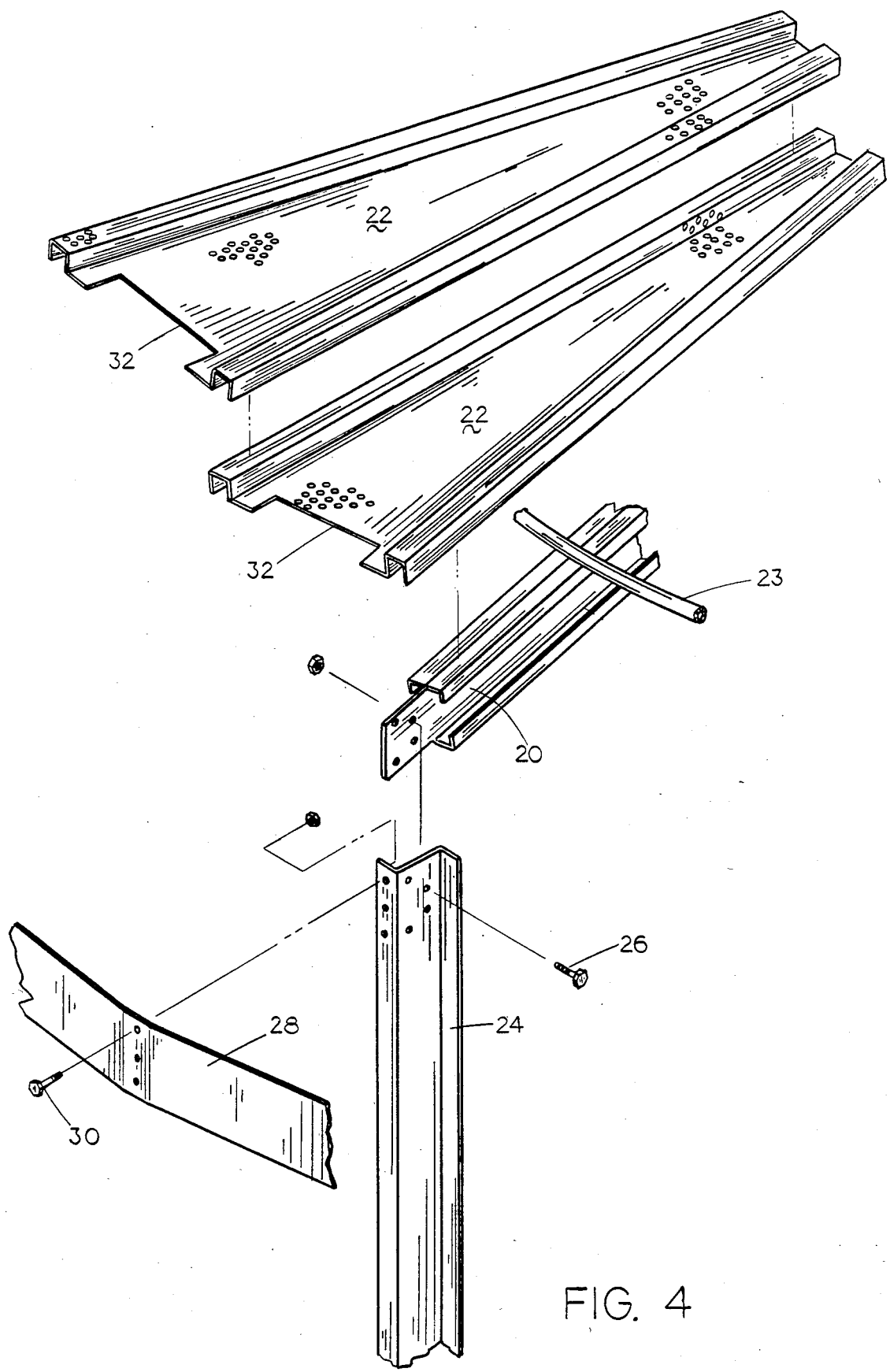
FIG. 4 is an exploded perspective view illustrating the tension band of this invention and its relationship to the drying floor and vertical stiffeners.

The lower ends of rafters 20 are connected to a vertically disposed stiffener 24 by bolts 26. Each of the stiffeners 24 has a generally Z-shape cross section as best seen in FIG. 2. A flat tension band 28 is positioned between the stiffeners 24 and the wall 14 and extends around the entire interior of the bin or around the entire lower end of the floor structure 12. The lower ends of the rafters 21 are bolted directly to the tension band 28 and one of the wall sheets of the wall 14. Band 28 may be of a single length of metal material or comprised of a plurality of lengths bolted together. The ends of the band 28 overlap and are secured together by any convenient means such as by bolts or the like. As seen in FIG. 3, bolts 30 extend through the side wall 14, band 28 and stiffeners 24. In some cases, the stiffeners 24 may be positioned on the outside of the bin.

The tension or tensioning band 28 described herein transfers the weight of the drying floor to the concrete foundation supporting the bin through the vertical walls of the bin and the vertically disposed stiffeners. The weight of the drying floor is uniformly transferred to the wall and stiffeners to provide the necessary support for the grain drying floor.

Thus it can be seen that the tension band of this invention accomplishes at least all of its stated objectives.

We claim:

1. A grain drying bin comprising,
   a base floor,
   a cylindrical wall extending upwardly from said base floor,
   a roof mounted on the upper end of said wall,
   a conically-shaped drying floor positioned within the bin and having its lowe periphery operatively secured to said wall and extending upwardly in an inclined direction therefrom, said conically-shaped floor including a plurality of spaced-apart support members having upper and lower ends, and a perforated floor mounted on said support members, the lower ends of said support members being operatively secured to said cylindrical wall, and a vertically disposed, flat tension band positioned between the lower ends of said support members and said cylindrical wall and being secured to said support members and cylindrical wall, said tension band extending completely around the lower end of said conical-shaped floor to transfer the weight of the conically shaped floor to said cylindrical wall in substantially a uniform manner.

2. The bin of claim 1 wherein bolt members extend through said cylindrical wall, tension band and the lower ends of said support members.

3. The bin of claim 2 wherein a plurality of vertically disposed and horizontally spaced-apart stiffeners are positioned adjacent said cylindrical wall, said stiffeners being positioned adjacent the lower ends of at least some of said support members and being secured to said tension band and said cylindrical wall.

4. The bin of claim 3 wherein said stiffeners are positioned adjacent the inside surface of said cylindrical wall.

5. The bin of claim 3 wherein said stiffeners are positioned adjacent the outside surface of said cylindrical wall.

* * * * *